UNITED STATES PATENT OFFICE.

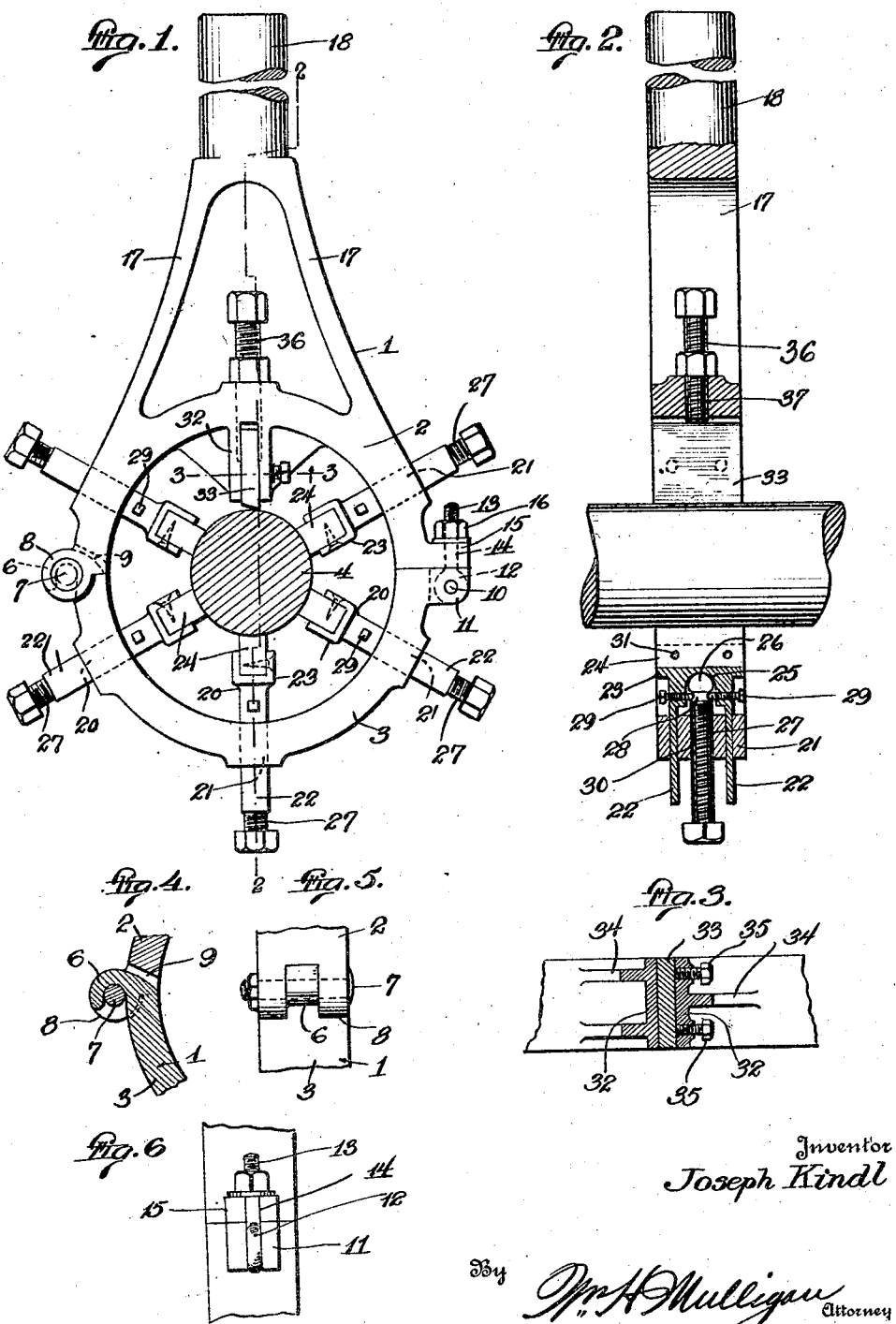

JOSEPH KINDL, OF ST. LOUIS, MISSOURI.

HAND-SHAFT-TURNING DEVICE.

1,415,039.      Specification of Letters Patent.      Patented May 9, 1922.

Application filed July 26, 1920. Serial No. 399,021.

*To all whom it may concern:*

Be it known that I, JOSEPH KINDL, a citizen of the United States, residing at St. Louis, in the State of Missouri, have invented certain new and useful Improvements in Hand-Shaft-Turning Devices, of which the following is a specification.

This invention relates to machine tools and more particularly to an improved implement for turning a shaft by hand.

The primary object of the invention is to provide a hand shaft turning device which will be operated to turn the shaft to a smaller diameter in the manner now accomplished by a lathe.

The invention contemplates the provision of an implement which may be rotated around the shaft and which will carry a tool engaging the shaft so that a portion of the shaft will be removed as the implement is turned, resulting in a uniform reduction in the diameter of the shaft.

Other objects of the invention will appear upon consideration of the following detail description and accompanying drawings, wherein:—

Figure 1 is a side elevation showing the tool in position on a shaft,

Figure 2 is a vertical section through the same, taken approximately on the line 2—2 of Fig. 1, Figure 3 is a fragmentary horizontal section on the line 3—3 of Fig. 1, Figures 4 and 5 are detail views of the hook hinge for the tool, and Figure 6 is a detail view of the fastening means for the movable portions of the implement.

Referring to the drawing by numerals, the frame 1 consists of two substantially semi-circular members 2 and 3 which when assembled form a ring included in the frame to encompass the shaft 4 to be turned. One end of the member 3 is provided with a hook 6 adapted to receive a pivot pin 7 carried by the ears 8 formed on the adjacent end of the complementary portion 2 of the frame. This end of the member 2 adjacent the ears 8 is cut out as indicated at 9 so that the hook may be inserted in position to pivotally connect these two ends of the semi-circular members together.

The ends of the members 2 and 3, opposite the pivotal connection, are releasably connected together by a connecting device shown in Figs. 1 and 6 of the drawing. A pivot pin 10 is passed through the ears 11 carried by the end of the member 3 and an eye-bolt 12 is pivotally mounted on the pin 10 so that its shank 13 may swing into position in the slot or notch 14 formed in the lug 15 on the adjacent end of the member 2. When the shank is swung into position as shown in the drawing, a washer is placed upon the shank and a nut 16 screw threadedly mounted on the shank so as to engage the washer and bind the same into engagement with the lug 15 thus firmly connecting the two members 2 and 3 together to form the circular portion of the frame.

Extension arms 17 project from the member 2 and their meeting ends integrally connect with a handle 18 which may be grasped by the operator to impart the necessary rotary movement to the implement when it is in use.

In order that the implement may be centrally mounted and concentrically disposed with respect to the shaft 4, a series of guide members are provided, each of which is designated generally at 20. Since these members are all of the same general construction a description of one will suffice. Radial slots 21 are provided in the frame through which guide members 22 are slidably mounted. These guide members are disposed parallel and have their inner ends integrally connected with a head 23 to which is attached a shaft engaging block 24 which may be made of any preferred material but which is preferably constructed of fibre board. These blocks 24 engage the surface of the shaft as shown clearly in Fig. 1. In the head member 23 is formed a socket 25 and the ball-end 26 of a set screw 27 is mounted in the socket. Adjacent the ball-end 26 the screw is provided with an annular groove 28 which receives the ends of oppositely disposed set screws 29 carried by the head 23 whereby the set screw is connected to the head in a manner that will permit rotation of the screw without changing its relative position with respect to the head 23. Since the adjustable set screw 27 is screw threadedly mounted in a screw threaded opening 30 provided in the frame between the guide slots 21, it will be readily appreciated that rotation of the set screw 27 will move the fiber block 24 inwardly or outwardly as desired, while the guide members 22 serve to give the desired rigidity to the shaft engaging members. The fiber block 24 is held in position by fastening members 31 which extend through flanges formed on the head 23 and into the block 24. It will be noted that these guide members which engage the shaft are disposed radially at equally spaced distances so that the implement may be concentrically disposed with respect to the center of the shaft and the fiber blocks will engage the surface of the shaft to insure even movement of the implement when the same is rotated around the shaft.

The cutting tool comprises a piece of high speed tooled steel having a cutting edge formed thereon to engage the shaft. This cutting tool is disposed between two plates or flanges 32 so that the cutting tool 33 is radially movable to be adjusted toward and away from the shaft. The two plates are braced by the integrally formed webs 34 and set screws 35 are employed to maintain the cutting tool 33 in fixed position after being adjusted and to prevent chattering of the tool as it operates. In addition to this holding means for the cutting tool an adjusting bolt 36 is provided screw threadedly mounted in a screw threaded opening in the frame in radial alinement with the cutting tool and adapted to extend into the space between the plates or flanges 32 so that the end of the adjusting bolt can engage the cutting tool 33 whereby the head of the bolt 36 may be turned to force the bolt into engagement with the cutting tool and thus cause the cutting edge to firmly engage the shaft.

In operation, the tool will first be opened by releasing the connecting eye-bolt 13 whereby the two members 2 and 3 may be opened to permit the same to encompass the shaft. When the members are placed around the shaft the same are connected together by the connecting bolt 13 and the nut 16 will be firmly tightened in position. The heads of the adjusting screws 27 will then be turned until the guide blocks 24 engage the surface of the shaft 4. The tool will then be adjusted into position to engage the shaft whereupon the operator will begin the rotary movement by grasping the handle 18 and imparting the turning movement to the implement. This operation will continue until the shaft has been turned down to the desired size.

I desire it to be understood that minor changes may be made in the details of construction without departing from the spirit of the claim hereunto appended.

What I claim is:—

A hand operated turning tool for turning shafts, comprising a substantially circular frame having radial slots formed therein, the said slots being arranged in pairs, the frame also having a series of screw threaded openings one being arranged between the slots in each pair, a series of guide members each including a head having parallel guide arms extended through a pair of the said slots, a shaft engaging member carried by each head, and an adjustable screw mounted in each of the said screw threaded openings and engaged with the said head whereby the said head may be adjusted radially.

In testimony whereof I affix my signature.

JOSEPH KINDL.